May 11, 1965  G. H. DARRELL  3,182,372
SEPARABLE FASTENER
Filed Jan. 22, 1964

INVENTOR.
George H. Darrell
BY
Kenway, Jenney & Hildreth 3,182,372
SEPARABLE FASTENER
George H. Darrell, 25 Chestnut St., Dedham, Mass.
Filed Jan. 22, 1964, Ser. No. 339,550
1 Claim. (Cl. 24—230)

This invention comprises a new and improved seat belt for use by occupants of automobiles and other conveyance.

While the general consensus of opinion is that such belts are a wise and safety precaution the driver of an automobile often sets forth without connecting the ends of the belt about his body. When this oversight is recognized it is extremely awkward to rectify it without taking both hands off the steering wheel and thus invoking danger by temporary loss of control. Most drivers are too impatient to stop and properly connect the belt sections and so proceed without the protection of the belt. The object of the present invention is to provide a seat belt so constructed and arranged that the ends of its sections may be brought into interlocking connection with one hand, that is to say, with the thumb and finger of one hand. Thus the ends of the belt sections may be brought into proximity in the driver's lap where the space between them may be spanned by one hand. The fittings are conveniently shaped to be grasped and drawn into interlocking engagement by one hand while the other remains in full control of the steering wheel. In one aspect the belt of my invention comprises sections having interlocking terminal fittings relatively movable into engagement, one fitting having a flange or flanges for engagement by the fingers of one hand and the other having an upstanding thumb engaging portion for the thumb of the same hand.

These and other features of the invention will be best understood and appreciated from the following description of a preferred embodiment thereof selected for purposes of illustration and shown in the accompanying drawings in which.

Figure 1:
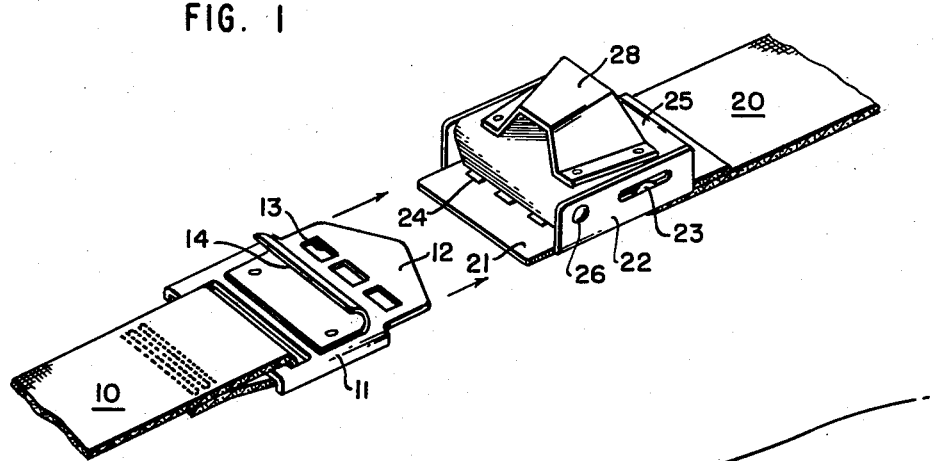
FIG. 1 is a view in perspective of the belt sections and their fittings.

The belt sections 10 and 20 are constructed of duck or other heavy fabric. The left hand terminal fitting includes a flat metal sleeve 11 to which the belt section 10 is permanently secured. The sleeve 11 is extended forwardly in the form of a flat pilot projection 12 and this is provided with a transverse row of rectangular holes 13. An upstanding flange 14 is riveted or otherwise permanently secured to the upper surface of the sleeve 11. This sleeve is of substantially the full width of the fitting and rearwardly concaved to receive the finger tips of the driver's right hand as suggested in FIG. 2.

The terminal fitting of the belt section 20 comprises a flat metal plate 21 having upright side walls 22. Between these walls extend a transverse pin 23 about which the end of the belt section is permanently secured. The plate 21 is extended forwardly in the form of a flat pilot and is adapted to receive on its upper surface the pilot 12 of the left end fitting. It is provided with a row of teeth or detents 24 which cooperate with the holes 13 in making an interlocking fitting when the belt sections are properly connected.

The right hand fitting also contains an angle plate or hold down 25 pivoted to swing upon a transverse pin 26 extending between the walls 22 and biased always into the closed or locking position by a torsion spring 27. The down-turned flange portion of the angle plate 25 serves to hold the pilot extension 12 in locking position with the teeth 24 when in normal closed position. In order to release the belt sections the angle plate 25 may be rocked in counterclockwise direction against the tension of the spring 27 and when this is done the pilot plate 12 may be lifted sufficiently to disengage it from the teeth 24.

As herein shown the angle plate 25 carries an upstanding thumb-engaging portion 28 of somewhat funnel shape, thus providing a concavity or loop into which the thumb may be naturally slipped.

Figure 2:
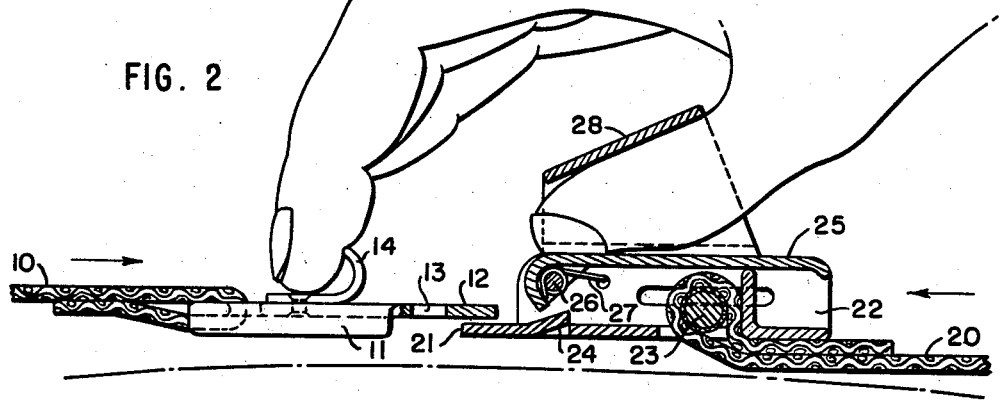
FIG. 2 is a corresponding view in longitudinal section.

It will be apparent that having preliminarily located the belt sections as shown in FIG. 2 and engaged the terminal fittings with the thumb and fingers of the right hand the two fittings may be drawn into interlocking engagement without distracting the driver or requiring any visual control.

In bringing the belt fittings into engagement the angle plate 25 is free to be rocked forwardly about the pin 26, thus increasing the leverage of the thumb-engaging loop 28 in advancing the right hand fitting and also engaging and holding the pilot 12 in locking position.

Figure 3:
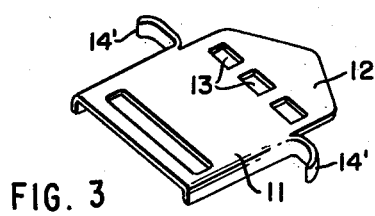
FIG. 3 is a fragmentary view of a modified fitting.

A modification of the left hand fitting is shown in FIG. 3 where the finger-engaging flange takes the form of hook-shaped flanges 14', one located at each side of the plate 11. They may be conveniently grasped with the first and fourth fingers of the right hand and are of course located symmetrically with respect to the loop 28.

Having thus disclosed my invention and described in detail an illustrative embodiment thereof, I claim as new and desire to secure by Letters Patent:

A seat belt fastener constructed and arranged for one-hand connection and release and having sections with interfitting terminal fittings, one fitting having a perforated pilot with an upstanding transverse flange adapted to be engaged by the fingers of one hand, and the other having an overlapping pilot with detents for engaging the perforations of the perforated pilot, and a hold-down angle plate adapted to engage the perforated pilot and hold the perforated pilot locked to the detents, said plate being pivotally mounted for upward movement from locking position and having an upstanding thumb-engaging loop projecting from one side of the fastener and said loop providing an opening for receiving a thumb, said angle plate being movable therewith into positions of increased leverage in releasing the pilots for separation of the detents of one pilot from the perforations of the other and located to be in position to be engaged by the thumb of the same hand for drawing the two fittings into engagement.

References Cited by the Examiner
UNITED STATES PATENTS

| | | | |
|---|---|---|---|
| 29,332 | 7/60 | Tiebout | 24—206.1 |
| 325,672 | 9/85 | Gray | 24—206.1 |
| 609,989 | 8/98 | Gans | 24—206.2 |
| 2,318,816 | 5/43 | Tinnerman | 24—20 |
| 2,749,155 | 6/56 | Kinghorn | 24—20 |
| 2,896,288 | 7/59 | Davis | 24—230.1 |
| 2,985,917 | 5/61 | Sunday | 24—230.1 |
| 3,013,317 | 12/61 | Weber | 24—230.1 |
| 3,084,411 | 4/63 | Lindblad | 24—230.1 |

FOREIGN PATENTS

| | | |
|---|---|---|
| 814,752 | 6/59 | Great Britain. |
| 871,819 | 7/61 | Great Britain. |

DONLEY J. STOCKING, Primary Examiner.
BERNARD A. GELAK, Examiner.